Patented Dec. 28, 1943

2,337,944

UNITED STATES PATENT OFFICE 2,337,944

CATALYTIC REACTIONS WITH CARBONACEOUS MATERIALS

Fritz Stoewener, deceased, late of Ludwigshafen-on-the-Rhine, Germany, by Hedwig Elisabeth Stoewener, administratrix, Ludwigshafen-on-the-Rhine, Germany, and Emil Keunecke, Ludwigshafen-on-the-Rhine, and Friedrich Becke, Mannheim, Germany; vested in the Alien Property Custodian No Drawing. Application April 17, 1941, Serial No. 389,038. In Germany December 1, 1938

16 Claims. (Cl. 196—53)

The present invention relates to a process of carrying out catalytic reactions with carbonaceous materials.

This application is a continuation-in-part to our application Ser. No. 321,210, filed February 28, 1940.

In carrying out catalytic reactions with carbonaceous materials at an elevated temperature, for example above 200° C. and more, particularly above 300° C., for example in the cracking of hydrocarbon oils or in the destructive hydrogenation of coals, tars and mineral oils it is known to use porous catalysts of porous materials as carriers for catalytic substances. Solid gels of silicic acid or silicates, in particular, have already been used for this purpose either alone or in combination with one or more metal compounds, preferably alumina. Such gels are generally distinguished by having pores of ultramicroscopic fineness. The pores of a given gel, however, are but rarely uniform in diameter; most gels rather possess pores of most diverse diameter varying for example between 0 and 50 millionths of a micron and above; part of the pores often exceeds even ultramicroscopic dimensions, depending on the conditions under which the gels were made. For catalytic purposes large-pored gels are usually preferred, i. e. gels the active pore volume of which is predominately made up of pores, for example to the extent of 80 to 90 per cent, the diameter of which spreads over a range of between 2 and 43 millionths of a micron because such gels are especially well suited for absorbing solutions of substances having a catalytic action. The gel-like catalysts and carrier masses hitherto used in catalytic reactions with carbonaceous substances, however, left much to be desired in efficiency, as no considerations were known which might be a guide in choosing the porous masses.

We have now found that, in practicing catalytic reactions with carbonaceous materials, especially in the refining, aromatizing or destructive hydrogenation of coals, tars and mineral oils, in particular also of middle oils obtained by destructive hydrogenation or from carbon monoxide and hydrogen, excellent yields are obtained, if such porous catalysts or carrier masses be used in which at least 30 per cent, preferably at least 50 per cent and most advantageously from 60 to 85 per cent, of the active pore volume consists of pores of a diameter of between 0 and 2 millionths of a micron; particularly good results are obtained if at least 15 per cent, preferably at least 25 per cent and most advantageously from 30 to 60 per cent, of the active pore volume consist of pores of a diameter of between 0 and 1 millionth of a micron.

It means already a great advantage if only the carrier mass of the catalyst, i. e. the skeleton left after dissolving out therefrom any additional catalytic materials, for example metal oxides, satisfies the above conditions, but even better results are usually obtained if the finished catalyst, i. e. the carrier inclusive of the catalytic substance, satisfies the conditions. For brevity's sake the term "catalyst" is henceforth meant to cover both the finished catalyst and the carrier for the catalytic substance.

Investigations into the pore diameter of a material are preferably carried out by the Kubelka method (see "Kolloid Zeitschrift", vol. 55, 1931, page 129 et seq.) but a complete adsorption isotherm need not be made out. It rather suffices to ascertain the adsorption power of the porous mass towards benzene vapor from a hydrogen current at 18° or 20° C. which at these temperatures possesses a relative saturation with benzene vapor of 1, 10 and 90 per cent, respectively, which degrees of saturation, according to Kubelka's formula $$D = \frac{B \cos \phi}{-\log S}$$

(loc. cit., page 136 (5)) are known to correspond to pore diameters up to 1, 2 and 43 millionths of a micron, respectively. In this formula D means the pore diameter in millionths of a micron, S means the relative degree of saturation of the benzene vapor, B means a constant (1.87), and $\cos \phi$ is equal to 1 for benzene according to Kubelka, (loc. cit., page 137, table XII).

The adsorption power for the different degrees of saturation is ascertained by determining (see Kubelka, loc. cit., pages 130/131) the increase in weight of the gel over which hydrogen with a relative saturation in benzene vapor of 1 per cent, 10 per cent and 90 per cent, respectively, is passed. The increase in weight is equal to the quantity of benzene adsorbed in the pores which, when divided by the specific gravity of benzene, indicates the pore volume corresponding to the above degrees of saturation.

The pore volume calculated from the adsorption power at a relative saturation of 90 per cent has been denoted herein as the "active pore volume," the "inactive pore volume" which exists in addition thereto and which only becomes obvious in the adsorption at a relative saturation of more than 90 per cent being ignored.

From among the numerous kinds of silica gels the fine-pored ones only come into consideration; they are advantageously made according to the processes of the German Patents Nos. 574,721 and 626,272. In making the said gels it is of high importance first to prepare a weakly acid homogeneous sol, preferably one with a pH-value of between 2 and 5, preferably between 3 and 4.5, to form a jelly by allowing the sol to solidify and then, when washing the said jelly for a far going removal of the salts formed during the sol-formation, to set up therein a pH-value of between 2 and 6, more preferably between 3 and 5. On drying the pieces of jelly then shrink into solid granules of porous gel, the pore volume of which spreads over the said range of diameters in the ratio indicated.

Another procedure consists in setting up in the silica jelly or silica-alumina jelly, precipitated in the presence of an acid, a pH-value inferior to 2, preferably between 1 and 2, the drying, by which the shrinking or formation of pores is to be accomplished, being carried not too far, but at the most to a content of water of from 20 to 40 per cent, removing part of the acid from the partially shrunk mass by a second washing until a pH-value of between 2 and 6, preferably between 3 and 5 has been set up, and then drying again. This method is the more preferred the more the pH-value is inferior to 2; for, if the water contained in the pure jelly or the jelly containing salts be completely replaced by concentrated sulphuric acid and the pore-formation be accomplished by complete shrinkage, fine-pored gels, which are suitable for use in the present process, would not result. The pH-value most suitable within the range of between 3 and 5 may be set up by removing acid from a jelly of stronger acidity or adding acid or acid media to a more weakly acid or neutral or only weakly alkaline jelly, preferably while this is being washed. The jelly consisting of silica gel or silica gel and some aluminum hydroxide or the waste jelly available in the form of small pieces may be shaped into cylinders or Raschig rings, preferably by means of an extrusion press, as described for instance in the German Patent No. 544,868, Example 1.

As a matter of course, the above directions not only apply to gels obtained by way of a sol, but also to precipitates and inhomogeneous jellies, in the manufacture of which an alkaline or extremely acid reaction is preferably avoided and a weakly acid reaction is maintained, provided these substances are brought to shrink at the said pH-value, preferably a pH-value of between 3 and 5. For the reason, however, that hard and coarse lumps are usually not obtained thereby, these precipitates or products obtained by drying the same must likewise be shaped in an extrusion or tabletting press, preferably according to the methods disclosed in the U. S. Patents Nos. 1,751,955 and 1,832,153 or, after homogenization by a severe mechanical treatment, as disclosed in German Patents Nos. 557,337 and 542,321.

The pure gels, as also those which contain metal oxides, may be laden, for example with metal compounds, such as for example aluminum salts or colloidal solutions of alumina by subsequently treating them in known manner, for example by impregnation or, as described in the U. S. Patent No. 1,832,153, by shaping; suitable substances may also be incorporated in the mass already during the manufacture thereof, for example according to U. S. Patent No. 1,797,804 and German Patent No. 617,593. Among catalytic additions to the silica sol or silica gel which, if desired, may contain alumina, we may mention above all the catalytic substances already known for the purposes in question, for example, for use in cracking, compounds of aluminum, boron, magnesium, beryllium or manganese and, for use in destructive hydrogenation, heavy metal sulphides or oxides, especially those of the metals of the sixth and eighth group of the periodic system, for example of molybdenum, tungsten, chromium and cobalt.

The catalysts may be further improved by subjecting them to an after-treatment by thorough washing or acid treatment. An acid treatment, which according to its intensity results in a partial or complete removal of metal oxides or other soluble substances contained in the mass or in a partial lading of the pores with small proportions of acid (sulphuric, hydrochloric, nitric or phosphoric acid), is followed equally by a thorough washing with distilled water and a drying, so that the final product is neutral or but extremely weakly acid.

For use as catalysts we may mention also synthetic bleaching earths or gels of the composition of synthetic bleaching earths or the thoroughly washed waste materials, so-called "Si-materials" containing hydrated silica and alumina and which result in the decomposition of minerals, earths, slags, or clays by means of acids, as for example sulphuric acid, hydrochloric acid, nitric acid or sulphurous acid, or the gels prepared therefrom, provided the pores of these materials have their diameters spread over the range of diameters above referred to.

The fine-pored catalyst according to the present invention is intended for use in the destructive hydrogenation of carbonaceous materials, especially middle oils, under pressures up to 1000 atmospheres and more, especially from 250 to 750 atmospheres. The catalysts employed above 250 atmospheres, in particular above 300 atmospheres, advantageously may only contain silica, alumina and/or magnesia, but no other hydrogenating metal compounds, whereas the catalysts employed with pressures of from 20 to 250 atmospheres, more particularly from 50 to 250 atmospheres, advantageously may contain also heavy metal sulphides, especially sulphides of molbdenum, tungsten, iron, nickel and cobalt.

The following example serves to illustrate how the present invention may be carried out in practice, but the invention is not restricted to the said example. The percentages and parts are by weight.

*Example*

100 grams of a fine-pored silica gel obtained by allowing a homogeneous sol (pH 3 to 4.5) to solidify, washing the jelly so obtained until a pH of between 3 and 5 has been reached and drying the jelly at from 200° to 300° C., the active pore volume of which gel consists of 35 per cent of pores with a diameter of between 0 and 1 millionth of a micron, of 35 per cent of pores with a diameter of between 1 and 2 millionths of a micron and of 30 per cent of pores with a diameter of between 2 and 43 millionths of a micron, i. e. of 70 per cent of pores with a diameter of between 0 and 2 millionths of a micron, is saturated with water vapor, gradually soaked with a solution of 8 grams of aluminum nitrate ($Al(NO_3)_3 \cdot 9H_2O$) in 50 cubic centimeters of water and dried at from 120° to 180° C. The dry gel is then impregnated with an aqueous solution of ammonium thiotungstate of 10 per cent strength which contains an excess of ammonium sulphide. The mass is then dried in the absence of air and put into a reaction tube and heated up to 400° C. while passing through hydrogen. The catalyst which then consists of silica-alumina gel containing 10 per cent of tungsten sulphide is then used in the destructive hydrogenation of a paraffin base gas oil boiling between 210° and 350° C. under a hydrogen pressure of 200 atmospheres at 400° C. with a throughput of 2 kilograms per liter of catalyst and per hour. The product obtained contains 62 per cent of gasoline with an octane number of 75.

What we claim is:

1. The process for the catalytic destructive hydrogenation of a carbonaceous material for the production of hydrocarbon oils, which comprises employing as a catalyst a silica-containing mass which is provided with at least one catalytically acting metal compound and of which at least 30 per cent of the total active pore volume consist of pores having diameters up to about 2 millionths of a micron.

2. The process as claimed in claim 1, which comprises employing as a catalyst a silica-containing mass of which at least 50 per cent of the total active pore volume consist of pores having diameters up to about 2 millionths of a micron.

3. The process as claimed in claim 1, which comprises employing as a catalyst a silica-containing mass of which from 60 to 85 per cent of the total active pore volume consist of pores having diameters up to about 2 millionths of a micron.

4. The process as claimed in claim 1, which comprises employing as a catalyst a silica-containing mass of which at least 15 per cent of the active pore volume consist of pores having diameters up to about 1 millionth of a micron.

5. The process as claimed in claim 1, which comprises employing as a catalyst a silica-containing mass of which at least 25 per cent of the active pore volume consist of pores having diameters up to about 1 millionth of a micron.

6. The process as claimed in claim 1, which comprises employing as a catalyst a silica-containing mass of which from 30 to 60 per cent of the active pore volume consist of pores having diameters up to 1 millionth of a micron.

7. The process for the catalytic destructive hydrogenation of a carbonaceous material for the production of hydrocarbon oils, which comprises employing as a catalyst a silica-containing mass of which at least 30 per cent of the total active pore volume consist of pores having diameters up to about 2 millionths of a micron and which is provided with at least one sulphide of a heavy metal of the 5th to 8th group of the periodic system.

8. The process for the catalytic destructive hydrogenation of a carbonaceous material for the production of hydrocarbon oils, which comprises employing as a catalyst a silica-containing mass of which at least 30 per cent of the total active pore volume consist of pores having diameters up to about 2 millionths of a micron and which is provided with at least one oxide of a heavy metal of the 6th to the 8th group of the periodic system.

9. The process for the catalytic destructive hydrogenation of a carbonaceous material for the production of hydrocarbon oils, which comprises employing as a catalyst a silica- and alumina-containing mass of which at least 30 per cent of the total active pore volume consist of pores having diameters up to about 2 millionths of a micron and which is provided with at least one catalytically acting metal compound.

10. The process for the catalytic destructive hydrogenation of a carbonaceous material for the production of hydrocarbon oils which comprises hydrogenating in the presence of a silica-containing mass as a catalyst which has been caused to shrink at a pH value of between 2 and 6 so that at least 30% of the total active pore volume consists of pores having diameters of up to 2 millionths of a micron and which is provided with at least one catalytically acting metal compound.

11. The process as claimed in claim 10 in which the silica-containing mass has been caused to shrink at a pH value of between 2 and 6 so that 30–85% of the total active pore volume consists of pores having diameters of up to 2 millionths of a micron.

12. The process as claimed in claim 10 in which the silica-containing mass has been caused to shrink at a pH value of between 2 and 6 so that at least 15% of the active pore volume consists of pores having diameters of up to 1 millionth of a micron.

13. The process as claimed in claim 10 in which the silica-containing mass has been caused to shrink at a pH value of between 2 and 6 so that 25–60% of the active pore volume consists of pores having diameters of up to 1 millionth of a micron.

14. The process as claimed in claim 10 in which the silica-containing mass is provided with at least one sulfide of a heavy metal of the 5th to the 8th groups of the periodic system.

15. The process as claimed in claim 10 in which the silica-containing mass is provided with at least one oxide of a heavy metal of the 6th to the 8th groups of the periodic system.

16. The process for the catalytic destructive hydrogenation of a carbonaceous material for the production of hydrocarbon oils which comprises hydrogenating in the presence of a silica- and alumina-containing mass as a catalyst which has been caused to shrink at a pH value of between 2 and 6 so that at least 30% of the total active pore volume consists of pores having diameters of up to 2 millionths of a micron and which is provided with at least one catalytically acting metal compound.

HEDWIG ELISABETH STOEWENER,
*Administratrix of Fritz Stoewener, Deceased.*
EMIL KEUNECKE.
FRIEDRICH BECKE.